United States Patent [19]

Katcher et al.

[11] 4,238,604

[45] Dec. 9, 1980

[54] PROCESS FOR PREPARING AN ODOR-FREE ACETYLATED STARCH

[75] Inventors: Jay H. Katcher, Dover, Del.; Joseph A. Ackilli, South Salem, N.Y.

[73] Assignee: General Foods Corporation, White Plains, N.Y.

[21] Appl. No.: 949,177

[22] Filed: Oct. 6, 1978

[51] Int. Cl.$^3$ .................................................. C08B 31/02
[52] U.S. Cl. .................................. 536/109; 536/104; 536/106; 536/110
[58] Field of Search ............... 536/110, 104, 106, 109

[56] References Cited

U.S. PATENT DOCUMENTS

| | | | |
|---|---|---|---|
| 2,682,535 | 6/1954 | Broderick | 260/231 |
| 2,845,417 | 7/1958 | Kesler et al. | 260/233.3 |
| 3,081,296 | 3/1963 | Smith et al. | 536/104 |
| 3,238,193 | 3/1966 | Tuschoff et al. | 536/106 |
| 3,839,320 | 10/1974 | Bauer | 260/233.5 |
| 4,048,435 | 9/1977 | Rutenberg et al. | 536/110 |

*Primary Examiner*—Melvyn I. Marquis
*Attorney, Agent, or Firm*—Mitchell D. Bittman

[57] ABSTRACT

A process for making an acetylated cross-linked starch substantially free of acetyl odor and flavor which comprises cross-linking a starch in a slurry, acetylating the cross-linked starch to an acetyl substitution of not more than 2.5%, thereafter washing the starch sufficiently to reduce the ash content to less than 0.20%, preferably forming a slurry of the acetylated cross-linked starch and adjusting the pH to 7 to 9.0, and thereafter drying the starch. The process provides a starch product which is substantially free from off odors or flavors and particularly useful in pudding formulations. Tapioca starch is utilized in preferred embodiments.

16 Claims, No Drawings

PROCESS FOR PREPARING AN ODOR-FREE ACETYLATED STARCH

BACKGROUND OF THE INVENTION

Field of the Invention

The present invention is concerned with the production of chemically modified starches, particularly tapioca starch used in puddings. In the past epichlorohydrin and propylene oxide routinely have been utilized to modify starch. Because of the possible undesirable health effects caused by the chlorohydrin residues suggested by recent studies, industry has been seeking ways to develop alternative chemically modified starches. One approach which has been followed is the use of an acetylated cross-linked starch which, for example, is a reaction product of acetic anhydride and phosphorus oxychloride with starch. In this process the starch is cross-linked (e.g., with phosphorus oxychloride, adipic anhydride or acrolein), and acetate esters are added to the basic starch back-bone. During the processing, various by-products are produced including sodium salts of acetates.

One of the drawbacks to the utilization of the foregoing modified starch in commercial formulations is the presence of detectable acetyl odors and the formation of off flavors. This is caused, it is thought, in-part, by a residual of sodium acetate remaining in the starch after processing.

It is the object of the present invention to produce an acceptable acetylated cross-linked starch having substantially no acetyl off flavors and odors by keeping them at undetected sub-threshhold levels both during storage and use in end products such as instant puddings.

SUMMARY OF THE INVENTION

We have found that by extensively washing the acetylated cross-linked starch to remove the sodium acetate residue and maintain the ash content below 0.20%, preferably 0.15%, preferably adjusting the final pH of the starch slurry prior to drying it to between 7 and 9.0, and limiting the acetyl substitution to under 2.5%, that the acetyl odors and flavors can be eliminated or minimized (kept at an undetectable sub-threshold level).

DISCLOSURE OF THE INVENTION

As background information, the chemical reaction involved in producing an acetylated cross-linked starch, where phosphorus oxychloride is the cross-linking agent and acetic anhydride is the acetylation agent, is demonstrated in the following reaction (St represents a starch molecule and X represents the number of available reactive hydroxyl groups per starch molecule):

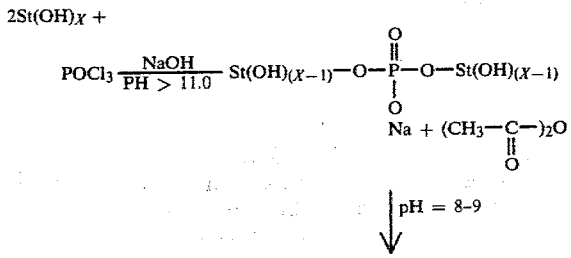

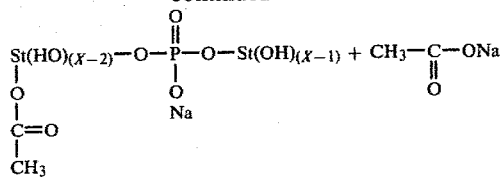

The process utilized for preparation of the above acetylated distarch phosphate comprises slurrying the starch in a caustic salt solution (pH greater than 9 and for better results pH above 11) at a temperature under gelatinization of the starch (preferably 20° to 30° C.) and introducing the cross-linking agent, i.e., phosphorus oxychloride, and mixing for a time (e.g., 45 minutes) to complete the reaction. Following completion of the cross-linking reaction, the slurry is neutralized with sulphuric acid to stabilize the reaction. Thereafter, the acetylation takes place by simultaneously adding acetic anhydride and a 3% caustic solution over approximately a four-hour period. The caustic solution is used to maintain a pH of 8.0 to 9.0 in order to allow the acetylation reaction to go to completion. Alternatively other cross-linking agents (e.g., acrolein or adipic anhydride) or acetylation agents (e.g., vinyl acetate) may be employed.

In the process of the present invention, the percent of acetyl substitution must be maintained below 2.5%, with below 2.4% being preferred and between 2.1 and 2.4% being most preferred in reducing acetyl off-flavors and odors. The acetylated cross-linked starch is then conducted through a washing step, preferably two washing steps, in order to reduce the ash content of the starch to below 0.20%, preferably below 0.15%. In commercial practice the starch could be washed first in three centrifuges (e.g., DeLaval* centrifuges) connected in series and then a further washing step on a filter wheel (e.g., the Eimco* filter wheel) which simultaneously washes and concentrates the starch slurry into a wet cake. In comparison, prior commercial practices simply employed a single wash step, for example, on a filter wheel, and the resultant ash content of previously available acetylated cross-linked starches was about 0.25 to 1.0%. Other washing methods may be employed, such as starch settling or filtration, but a combination of the centrifuge and the filter wheel is preferred.

*Tradename

The acetylated cross-linked starch is preferably slurried (e.g., to a solids content of about 20 to 45%), and the pH of the slurry is preferably adjusted to about 7.0 to 9.0 (optimally about 8.0 to 8.5). The pH of 9.0 is the upper limit, as above this pH the acetyl groups of the starch begin hydrolyzing off, while the pH of 7.0 is the lower limit, as below this pH acetyl odors and flavors begin building up. Prior commercial practices generally adjusted the pH to about 5 to 6. While the pH of the slurry is preferably adjusted after the acetylated cross-linked starch is washed, the pH can also be adjusted prior to the washing step.

The starch slurry can then be dried, or heated to gelatinize the starch followed by drying, or preferably heated to gelatinize the starch simultaneously with drying, as by drum drying. While the starch is preferably drum dried, other conventional methods of drying, such as flash drying, spray drying, or tunnel drying, may also be employed. The dried starch is then ground and screened to a particle size appropriate for subsequent use. When the starch is to be utilized in a pudding product, generally the starch is ground to a size wherein the particles pass through a 100 mesh U.S. Standard screen and optimally to a size wherein 95% by weight of the starch particles passes through a 230 mesh U.S. Standard screen.

The starches produced by the practice of the present invention are useful in cooked (ungelatinized starch) or instant (gelatinized starch) pudding formulations. Various starches may be modified and treated according to this invention including corn, potato, rice and amioca. However, because of neutral flavor characteristics, tapioca starch is preferred in pudding formulations.

The acetylated cross-linked starch of the present invention, especially those derived from tapioca starch, are extremely useful in instant pudding formulations in lieu of cross-linked starches modified with propylene oxide and other starches which may have objectionable chemical residues. Consumer tests of instant pudding formulations incorporating starches produced according to the process of the present invention demonstrated acceptability equal to or greater than cross-linked starches modified with propylene oxide previously utilized in the same formulations. Those skilled in the art can readily adjust the amount of starch utilized to obtain the desired viscosity in pudding formulations, the starch of the present invention generally being used at somewhat greater amounts than the starches modified with epichlorohydrin and propylene oxide.

ILLUSTRATIVE EMBODIMENTS

The following illustrative embodiments will further serve to demonstrate the nature of the present invention but are not intended to limit the invention which is defined in the appended claims.

EXAMPLE I

A solution of 900 grams of sodium sulphate, and 42 grams of sodium hydroxide in 7200 ml of water was prepared, the resultant solution having a pH of about 11.4. Six thousand grams of tapioca starch was then slurried into the above solution. Thereafter, under strong agitation, 0.45 grams of phosphorus oxychloride was mixed with the slurry for one hour, then 360 grams of acetic anhydride was added with the pH maintained between 8 and 9 by the additon of 8% sodium hydroxide and 15% sodium sulphate solution. The pH was then brought to 6.0. The resulting sample was divided into two portions. The first portion was extensively washed by filtration to reduce the ash content to below 0.15%. Then the washed starch was divided into four parts, slurried, and the pH's of each adjusted to 4, 5, 7 and 8 with a sodium bicarbonate or sulphuric acid solution. The products were filtered and dried.

The second portion (unwashed) of the original sample was also divided into four parts and the pH was adjusted as above. All of the washed samples exhibited no acetyl odor or flavor whereas unwashed samples (ash content of 4.2%) had a strong acetyl odor and flavor, except for those with a pH of 7 or 8, where the odor and flavor was less.

EXAMPLE II

Similar experiments were carried out wherein the pH and percentage of ash were varied and evaluated in view of the resultant odors formed. The odor valuations were conducted by placing samples in glass jars, maintaining the samples at 60° C. for two weeks and then removing the lids and sniffing the head space of the jars to evaluate odors formed. Percent acetylation and ash were determined by standard analytic techniques.

| pH | % Acetyl | % Ash | Odor Evaluation |
|---|---|---|---|
| 4 | 2.32 | .8 | Odor |
| 5 | 2.32 | .8 | Odor |
| 7 | 2.32 | .8 | Almost none |
| 8 | 2.32 | .8 | No odor |

The above four examples show that the higher pH's (i.e., 7 and 8) have the effect of reducing the resultant odors formed.

| pH | % Acetyl | % Ash | Odor Evaluation |
|---|---|---|---|
| 7.0 | 2.26 | .951 | Bad Odor |
| 7.0 | 2.26 | .353 | Odor |
| 7.0 | 2.26 | .191 | Very slight odor |
| 7.0 | 2.26 | .166 | No odor |
| Commercially available starch (National Purity 69A) | | | |
| 5.0 | 1.55 | .275 | Odor |

The above examples show that the reduction in ash content has the effect of significantly reducing the resultant odors.

EXAMPLE III

On a commercial scale, an acetylated distarch phosphate was formed by first slurrying tapioca starch in a caustic/starch solution of about 40% starch solids with the reaction temperature maintained between 20° and 30° C. The phosphorus oxychloride was added and mixed for 45 minutes at a pH of 11.2 to 11.7 with the cross-linking determined by viscosity measurement. Thereafter, the slurry was neutralized to a pH of 7.0 with sulphuric acid to stabilize the reaction. The acetylation was accomplished by simultaneously adding acetic anyhydride with 3% caustic solution over a 4-hour period, the caustic solution maintaining the pH between 8 to 9 to allow the reaction to go to completion. The degree of acetylation was continuously measured. The resulting acetylated distarch phosphate (% acetylation of 2.35) was then washed in two separate steps to reduce the ash to below 0.15%. The slurry was first washed with three DeLaval* centrifuges connected is series and then additionally washed on an Eimco* filter wheel. The washed starch was slurried at 40% solids, the pH adjusted to 7.5, and then the product was drum dried and ground to a size wherein 95% by weight of the particles pass through a 230 mesh U.S. Standard screen.

*Tradename

After 16 weeks of conditioned storage acetic off-flavor or odors had not been detected. When evaluated in an instant pudding formulation, the starch exhibited a sheen, texture and cooking quality comparable to cross-linked starches modified with propylene oxide.

What is claimed is:

1. A process for making a dry acetylated cross-linked starch in which the formation of the acetyl odor and flavor are reduced or eliminated, which comprises: cross-linking and acetylating a starch to an acetyl substitution of not more than 2.5%, thereafter washing the starch sufficiently to reduce the ash content to below 0.20%, and thereafter drying the starch.

2. Process of claim 1 further comprising forming a slurry of the acetylated cross-linked starch prior to drying and adjusting the pH of the starch slurry to within the range of about 7.0 to 9.0.

3. Process of claim 2 wherein said acetyl substitution is not more than 2.4%.

4. Process of claim 3 wherein said acetyl substitution is within the range of about 2.1 to 2.4%.

5. Process of claims 1 or 3 wherein said ash content is reduced to or below about 0.15%.

6. Process of claim 2 wherein said pH is adjusted to about 8.0 to 8.5.

7. Process of claim 2 wherein said starch is tapioca.

8. Process of claim 2 wherein at least two separate washing steps are employed.

9. Process of claim 8 wherein the washing is carried out on a centrifuge and a filter wheel.

10. Process of claim 2 wherein the starch slurry is gelatinized and dried by drum drying.

11. Process of claim 2 wherein the ungelatinized starch is dried to produce an acetylated cross-linked ungelatinized starch.

12. Process of claims 10 or 11 further comprising grinding the dried starch to a size wherein the starch particles pass through a 100 mesh U.S. Standard screen.

13. Process of claim 2 wherein the pH of the starch slurry is adjusted after the acetylated cross-linked starch is washed.

14. Product made according to the process of claims 1, 2, or 7.

15. Product made according to the process of claim 5.

16. Product made according to the process of claim 12.

* * * * *